ASSOCIATIVE MEMORY SYSTEM

Filed Feb. 21, 1968 4 Sheets-Sheet 1

INVENTOR
DANNY W. RORK
BY Louis A Kline
John J. Matlago
HIS ATTORNEYS

INVENTOR
DANNY W. RORK

BY Louis A. Kline
John T. Mathago
HIS ATTORNEYS

INVENTOR
DANNY W. RORK

BY Louis A. Kline
John J. Matlago
HIS ATTORNEYS

ASSOCIATIVE MEMORY SYSTEM

Filed Feb. 21, 1968

4 Sheets-Sheet 4

INVENTOR
DANNY W. RORK

BY Louis A Kline
John J. Matlago
HIS ATTORNEYS

1

3,543,254
ASSOCIATIVE MEMORY SYSTEM
Danny W. Rork, Hawthorne, Calif., assignor to The National Cash Register Company, Dayton, Ohio, a corporation of Maryland
Filed Feb. 21, 1968, Ser. No. 707,029
Int. Cl. G11c 15/00, 11/14
U.S. Cl. 340—174 5 Claims

ABSTRACT OF THE DISCLOSURE

An associative memory formed of thin film rod memory magnetic storage elements. Digit drive lines are provided connecting to solenoidal windings about the storage elements of the corresponding digit of each stored word and sense lines are provided connecting match detectors to the storage elements to sense the output signals common to each stored word. The stored words in the memory array are associatively compared to a descriptor word by sequentially applying an interrogating signal, corresponding to a binary descriptor digit, to each digit drive line producing a series of signals on the sense lines to the match detectors. The match detector circuitry decodes the series of signals on each sense line and classifies each stored word as being either less than, equal to or greater than the descriptor word. The classification results obtained by the match detectors are scanned and the stored words of a selected classification are read from the memory.

This invention relates to a memory system and particularly to an associative memory system comprised of non-destructive readout storage elements formed of magnetic films on a wire substrate.

In an associative memory, the retrieval of a stored word is based on the information content of the word sought rather than the location or address of the word in the memory. The entire associative memory can be searched rapidly in a single search period whereas a location addressed memory system must be queried word by word and thus requires a longer memory search time and a more extensive computer program. It is well recognized that an associative memory in a computer system is particularly valuable for certain data processing operations, such as accounting operations, inventory control, data analysis, information retrieval, etc., which operations frequently require that the memory be searched for words which can be located anywhere in the memory, their identification for subsequent readout being determined by how the words relate to a descriptor word used as a standard of comparison. The present invention provides an associative memory to be included in computer systems having the foregoing applications.

In accordance with the features of this invention, the associative memory is comprised of a plurality of thin film rods each having a plurality of non-destructive readout storage elements, such as the storage elements spaced along the rod to form a word as disclosed in the copending patent application of Danny W. Rork, Ser. No. 678,407, filed Oct. 12, 1967. Digit drive lines are connected to the storage elements of the corresponding denominational digit of each stored word and word drive lines are provided connecting to the storage elements which are common to a word. A common sense line connected to the conductive substrate used to form the rod senses output signals generated by sequentially switching the storage elements. During a search period, the digits of the stored words are compared to corresponding digits of a descriptor word by the application of an interrogating signal sequentlly on each digit drive line, the polarity of the interrogating signal corresponding to the descriptor

2 digit. An output signal is provided on each sense line following each interrogating signal, the output signal being a pulse of one polarity when the stored digit is greater than the descriptor digit, and of the other polarity when the stored digit is less than the descriptor digit. No output pulse is produced when the stored digit is equal to the descriptor digit. The common sense lines for each stored word are each connected to a match detector which classifies the stored word, on the basis of the sequential output signals, as being either greater than, less than or equal to the descriptor word. The comparison results stored in the match detectors are scanned and the stored words of a selected classification are read from the memory in a parallel manner by a read current pulse on the word drive line producing output signals on the digit drive lines which reflect the binary digits stored in the corresponding storage elements.

Accordingly, one of the objects of this invention is to provide an associative memory having the foregoing features.

A further object of this invention is to provide an output signal from a storage element as the digit stored therein is interrogated by a signal representative of a descriptor digit, the output signal indicating that the stored digit is either less than, equal to or greater than the descriptor digit.

Another object of this invention is to provide circuitry to sense the output signals resulting from a comparison of the digits of a descriptor word to the corresponding digits of the stored words and to decode these signals classifying each stored word relative to the descriptor word.

Other objects and features of the invention will become apparent to those skilled in the art as the disclosure is made in the following detailed description of a preferred embodiment of the present invention as illustrated in the accompanying sheets of drawings, in which.

Figure 8:
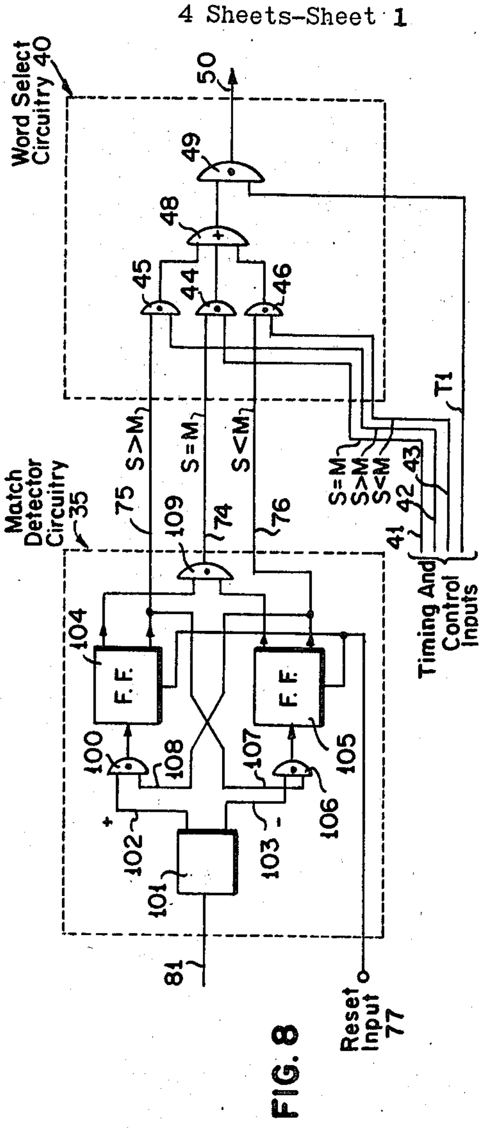
Figure 7:
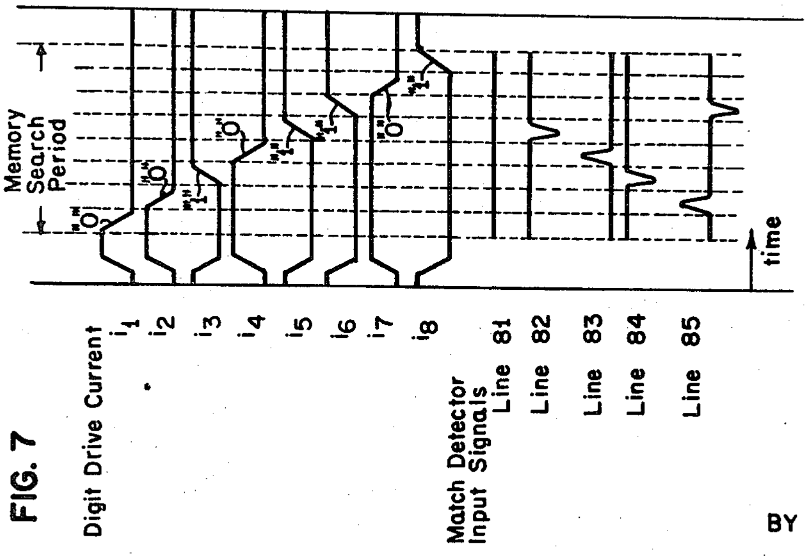
Figures 2, 2A, 3:
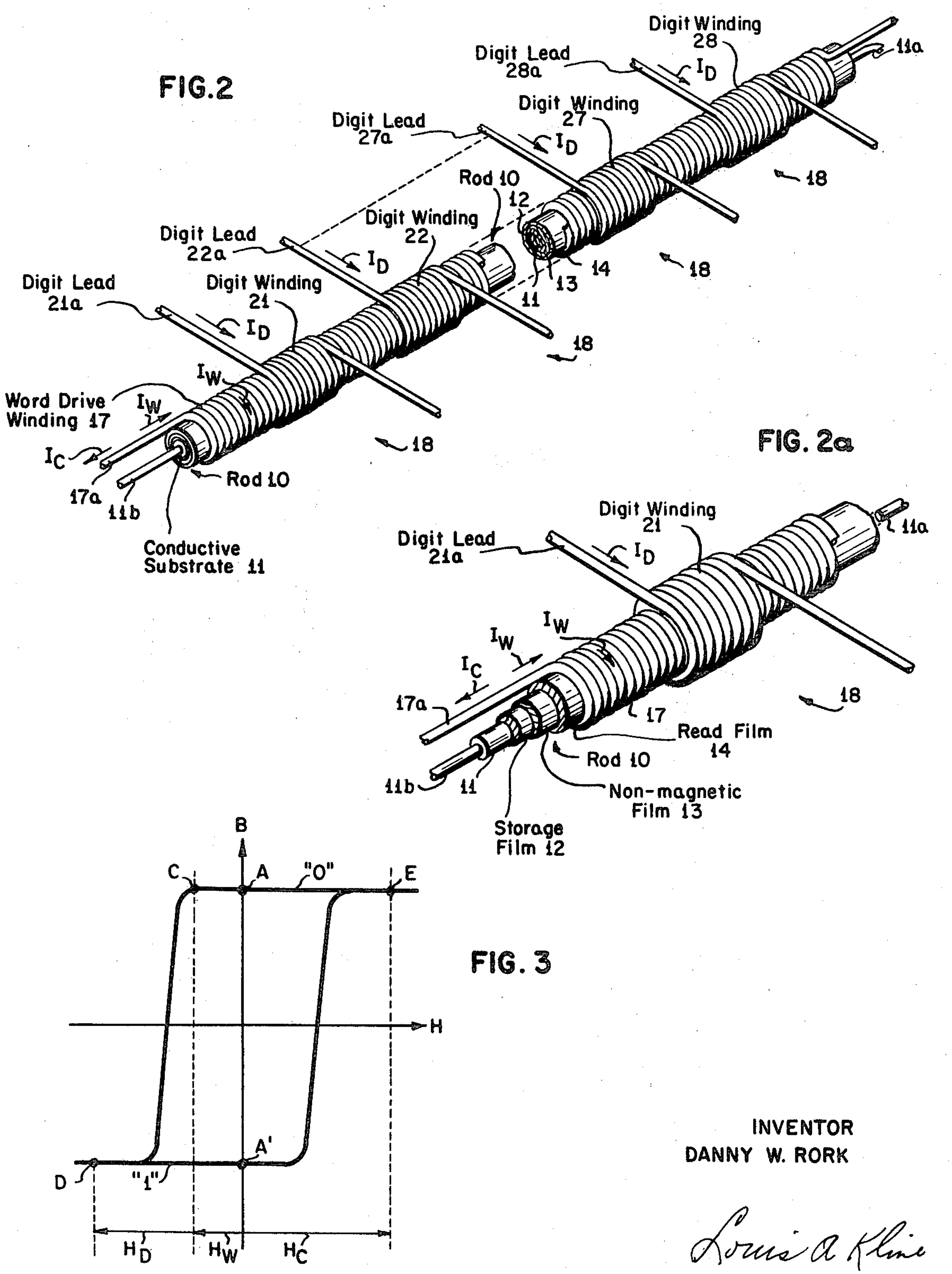
FIG. 2 is a perspective view of a plurality of magnetic memory elements spaced along a length of rod structure.
Figure 4:
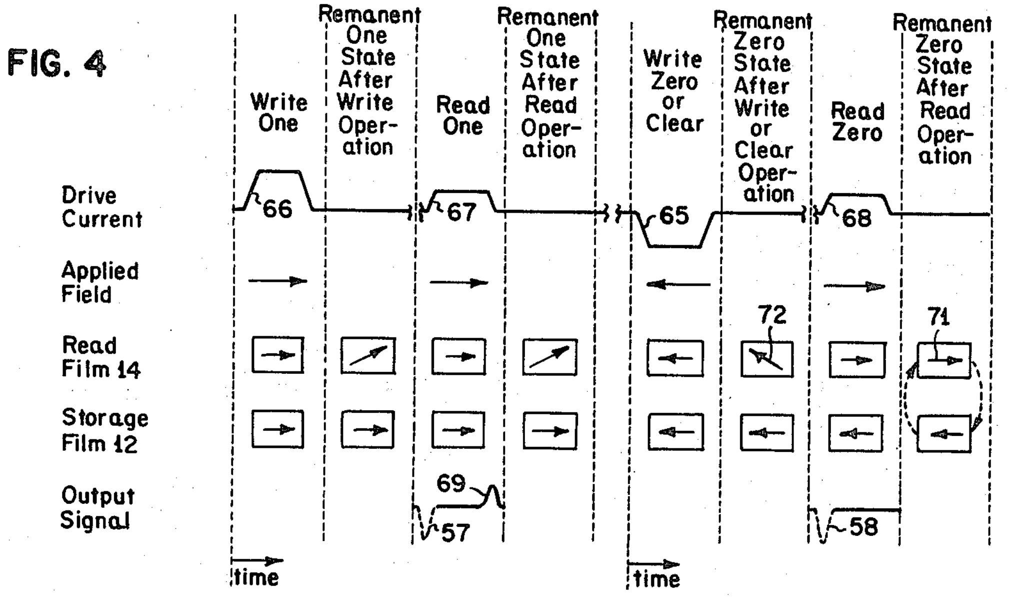
Figure 5:
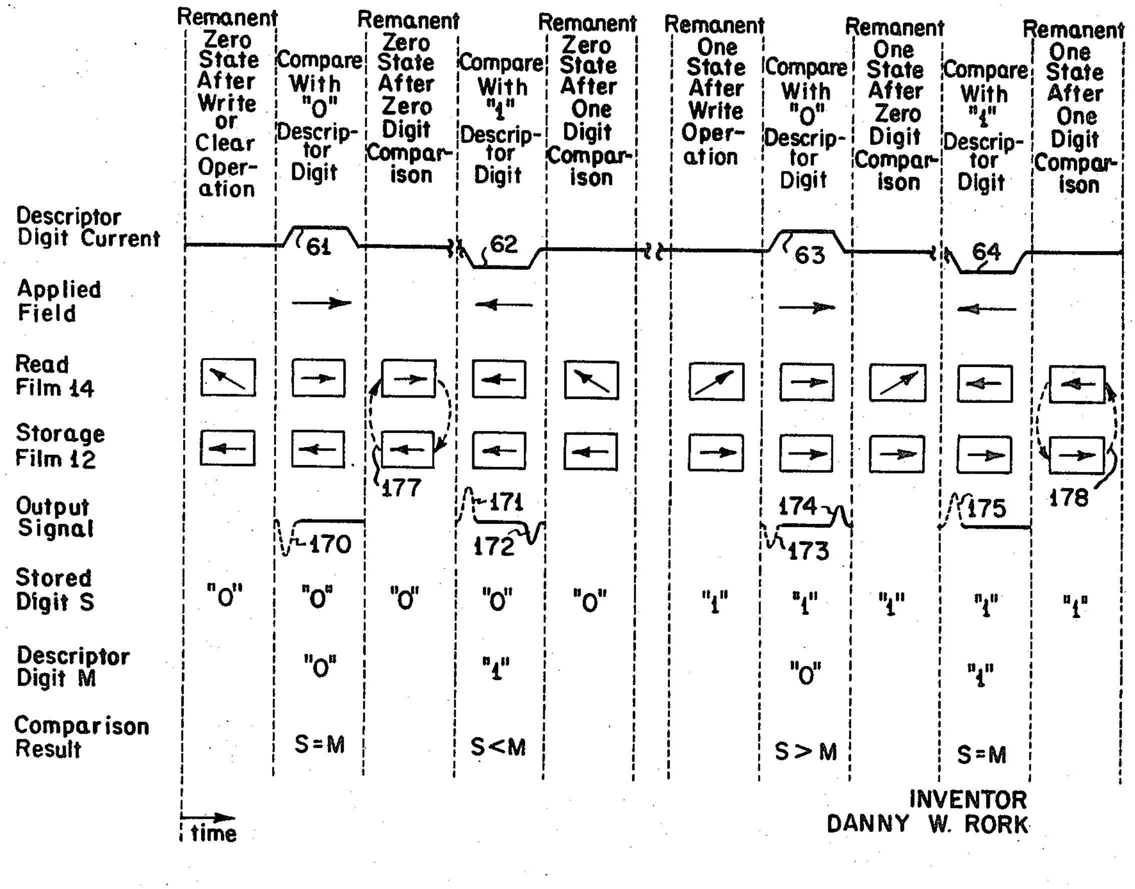
Figure 6:
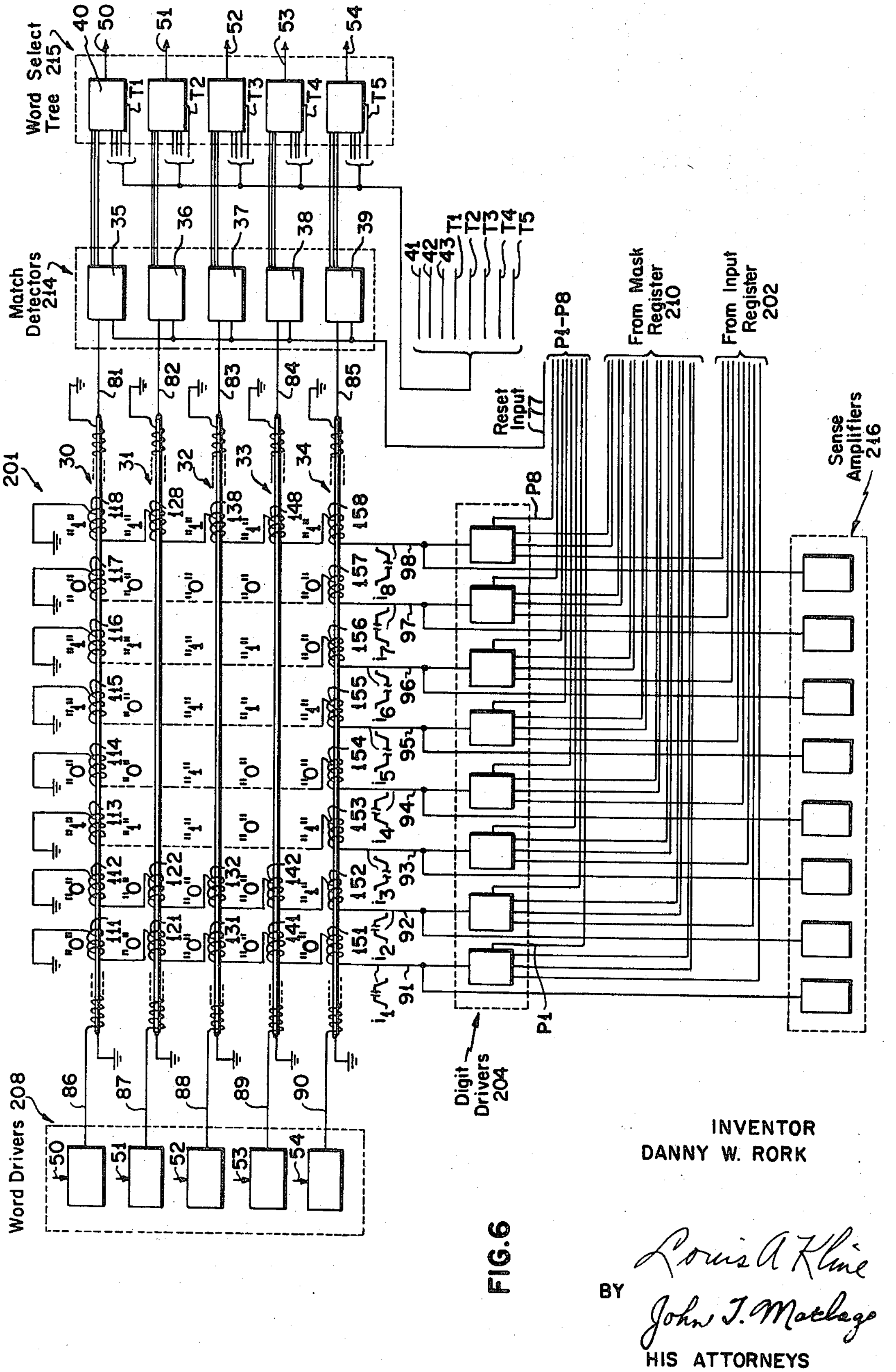

FIG. 2*a* is a perspective view of a portion of FIG. 2 showing a single magnetic memory element enlarged to illustrate the structure of the multilayer thin film rod structure;

FIG. 3 is a graph illustrating the hysteresis characteristic of the magnetic storage film provided on the magnetic memory element of FIG. 2*a*;

FIG. 4 illustrates the states of the magnetic films provided on the magnetic memory element of FIG. 2*a* as a result of the read and write operations;

FIG. 5 illustrates the output signals obtained upon comparing a descriptor digit to a digit stored in the magnetic memory element of FIG. 2*a*;

FIG. 6 illustrates a memory array and associated circuitry used to describe the operation of the associative memory arrangement of the present invention;

FIG. 7 is a timing diagram which will be used to describe the operation of the memory array of FIG. 6; and FIG. 8 is a block diagram of the match detector and connecting word select logic circuitary of FIG. 6.

Figure 1:
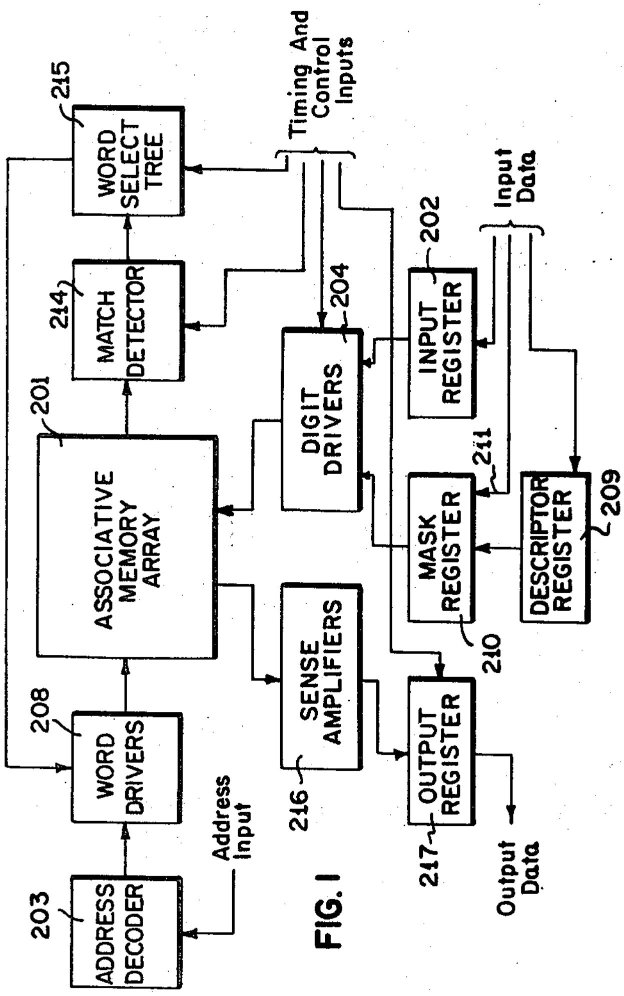
FIG. 1 illustrates a simplified block diagram of an associative memory system.

An associative memory system which will now be more particularly described with reference to the simplified block diagram depicted in FIG. 1 showing an associative memory array 201 with connecting circuitry. Words are written into the memory array 201 by entering the words successively into an input register 202. Signals corresponding to the digits of the word, generated by digit drivers 204, are applied to the memory array 201 for storing each word in register 202 at a storage location of the memory selected by word driver 208 energized by address decoder 203. An associative search of the memory array 201 for all or a portion of a descriptor word is obtained by use of a mask register 210 which gates digits from descriptor register 209 to digit drivers 204 in response to signals on input lines 211 supplied from connecting computer logic. The digit drivers 204 provide output current pulses to the memory array 201 for each of the digits gated by the mask register 210. The selected portions of the descriptor word are then compared to the corresponding portions of the words stored in the memory array 201 and the results of this comparison are read out and stored in a match detector 214 for sampling by a word select tree 215. The word select tree 215, in response to the comparison results from the match detector 214, selects the words to be retrieved from the memory array 201. Selected words are read from the memory array 201 by drive currents from the word drivers 208 to the memory array 201 producing data pulses sensed by sense amplifies 216 and placed into an output register 217. Timing and control inputs from connecting computer logic (not shown) to the digit drivers 204, the output register 217, the match detectors 214 and the word select tree 215 sequence the operation of these circuits in the order described above.

The thin-film magnetic storage elements of the associative memory array 201 are shown in FIGS. 2 and 2*a*. Referring first to FIG. 2, the preferred embodiment for a plurality of storage elements 18 along a rod 10 is illustrated. The solenoid windings on the rod 10 include a word drive winding 17 wound along the full length of the rod 10 so as to be common to all the storage elements 18, and individual digit windings 21, 22 . . . 27, 28 spaced along the rod 10 such that one of the digit windings is provided for each of the magnetic storage elements 18. A word drive lead **17*a* provides an electrical connection to word drive winding 17, and digit leads 21*a*, 22*a* . . . 27*a*, 28*a* provide electrical connections to digit windings 21, 22 . . . 27, 28, respectively. Leads 11*a* and 11*b* provide electrical connections to the respective ends of rod 10**.

Referring now to FIG. 2*a*, a typical magnetic storage element 18, as described in the aforementioned copending patent application, is shown to include a portion of the rod 10 with the word drive winding 17 and one of the digit windings such as the digit winding 21. The rod 10 comprises a conductive substrate 11, a magnetic storage film 12 deposited on the substrate 11, a non-magnetic barrier film 13 deposited over the storage film 12, and a magnetic read film 14 deposited over film 13. In the preferred embodiment, the conductive substrate 11 is a beryllium copper wire having a diameter of about 10 mils. The storage film 12 is an isotropic magnetic layer of approximately 97% iron—3% nickel, by weight, having a thickness of about 4800 angstroms and a coercivity of about 14 oersteds. The non-magnetic film 13 which separates the storage film 12 from the read film 14, is a copper layer having a thickness of about 2000 angstroms. The read film 14 is deposited in an axial magnetic field so as to produce an axially-oriented anisotropic permalloy layer of approximately 80% nickel and 20% iron, by weight, having a thickness of about 8000 angstroms and a coercivity of about 2 oersteds. As will be discussed in the ensuing description in connection with FIG. 4, the read film 14 is coupled to the axial field of the storage film 12 in the storage unit 18 such that the remanent state of the read film 14 is controlled by the state of the storage film 12. The coercivity of the magnetic storage film 12 is sufficiently high with reference to the coercivity of the magnetic read film 14 so as to permit a read current pulse applied to one of the digit windings or the word drive winding to momentarily change the magnetic state of the read film 14 by overriding the magnetic coupling of the storage film 12, but without having any affect on the magnetic state of the film 12. Leads **11*a* and 11*b* provide electrical connecitons to the respective ends of the conductive substrate 11 of the rod 10 and are used for sensing a change in remanent magnetization of the read film 14**.

Each magnetic storage element 18 includes the portion of the rod 10 in the immediate vicinity of each of the digit windings 21 to 28 as shown in FIG. 2. It will be understood that the magnetic storage film 12 provided on the rod 10 has a rectangular hysteresis characteristic and an elemental portion thereof, such as the portion shown in FIG. 2*a*, may be switched in two directional states of saturation in the axial direction of the rod 10 by simultaneous currents applied to one of the digit leads **21*a*, for example, and to the word drive winding lead 17*a*, changing the magnetic direction of the storage film 12 by domain wall switching. The read film 14 is coupled to the storage film 12 so that the magnetic field created by the remanent state of the storage film 12 changes the remanent magnetic direction of the read film 14 for each storage element 18 to a skewed position if the two films 12 and 14 are forced into the same parallel magnetic direction by a drive current 66, as illustrated in FIG. 4. The magnetic direction of the read film 14 changes by a combination of domain wall and rotational switching which results from plating the permalloy material for film 14 in an axial magnetic field. The switching of the read film 14 produces changing magnetic fields in directions both axial and normal to the substrate 11 and consequently generates output signals which may be detected at lead 11*a* of the substrate 11, lead 17*a* of the word driving winding 17, or leads 21*a*, 22*a*, . . . 27*a*, 28*a* of the digit windings 21, 22 . . . 27, 28 of the respective storage elements 18. The signals generated at lead 17*a* are equivalent in significance to the signals generated at lead 11*a* and may alternatively be used in equivalent systems embodying the storage elements 18 arranged as shown in FIG. 2. The use of the signals at digit leads 21*a*, 22*a* . . . 27*a*, 28*a* will be further considered when the non-destructive readout of the storage element 18 is described and the use of the signals generated at lead 11*a* will be further considered in connection with the associative memory operation of the storage element 18**.

Referring to FIG. 3 showing a graph of the hysteresis characteristic of the magnetic storage film 12, it will now be described how binary data may be written into each of the magnetic storage elements 18 shown in FIG. 2 by driving the storage film 12 of each storage element 18 to one of two opposing magnetic directions corresponding to the binary digit "1" or "0." Each of the bistable magnetic storage elements 18 will reside at or near point A for a "0" state and point A′ for a "1" state. A write operation is commenced by first clearing all the magnetic storage elements 18 of FIG. 2 with a clear current pulse $I_C$ applied to word lead **17*a* producing the switching field $H_C$ shown in FIG. 3 and driving all the magnetic storage elements 18 into the "0" saturation remanent state, as indicated as point E in FIG. 3. The storage elements 18 in the "1" state prior to the application of current $I_C$, are driven to the "0" state, i.e., from point A′ to point E in FIG. 3 by the switching field $H_C$. On the other hand, the magnetic storage elements 18 already in the "0" state prior to the application of current pulse $I_C$, are merely driven from point A to point E in the same "0" saturation state. Momentarily referring to FIG. 4, it is shown that when a clear pulse 65 is applied, the magnetic storage film 12** is switched to a "0" state as schematically illustrated, and assumes the remanent "0" state, as shown.

From the prior explanation of the clearing operation, it will be understood that after the application of current pulse $I_C$ to word lead **17*a*, each of the magnetic storage elements 18 common to the word drive winding 17 in FIG. 2 will reside in the "0" state at point A regardless of its previous magnetic state. To perform the write operation, a current $I_W$ is then applied to the word drive lead 17*a* producing the magnetic field $H_W$ indicated in FIG. 3, which field drives the magnetic storage elements 18 from point A to point C, a substantial step towards the "1" state but still not sufficient by itself to change the state of the storage elements 18** shown in FIG. 2.

When a "1" is to be written, the additional magnetic field $H_D$ required to switch a particular element is provided by applying a digit current $I_D$ to the digit winding lead of the element to drive the element the remaining way to the "1" state, as indicated as point D in FIG. 3, the element then returning to point A' when the current pulses $I_W$ and $I_D$ are terminated. Momentarily referring to FIG. 4 again, it is seen that when a current pulse 66, which may, for example, represent the sum of current pulses $I_W$ and $I_D$, is applied, the magnetic storage film 12 is switched to a "1" state as schematically indicated and following the termination of the pulse the storage and read films assume the remanent "1" state as shown.

It should be obvious that in the above described mode or operation if a "0" is to be written into a storage element 18 after a clear operation and during a write operation, no digit current is applied to the corresponding digit leads 21*a*, 22*a* . . . 27*a* or 28*a* of the word, and a magnetic storage element 18 is driven only to point C by the field $H_W$ produced by the write current $I_W$, and the storage element 18 remains in the "0" state and returns to point A when the current pulse $I_W$ applied to the word drive lead 17*a* is terminated. From this description it will be understood that during a write operation the current $I_W$ is always applied to the word lead 17*a*, but the digit current $I_D$ is applied to the digit leads 21*a*, 22*a* . . . 27*a* or 28*a* of the word only if a "1" is to be written into the corresponding magnetic storage elements 18.

Having considered how the word is written into the storage elements 18, it will now be described how the word is read from the storage elements 18 of FIG. 2.

The contents of the storage elements 18 are read nondestructively, i.e., the storage elements 18 described herein have a non-destructive readout capability and do not require that the data be written back into them to preserve the data. A read current pulse 67 as shown in FIG. 4 is applied to the word drive lead 17*a* which conditions the read film 14 by aligning the film 14 of each storage element 18 having a stored "1" to the applied field created by the current pulse. At the completion of the current pulse, the coupling effect of the storage film 12 will skew the direction of magnetization of the read film 14 of those storage elements 18 having films 12 and 14 whose magnetization have been forced by the read pulse into the same parallel direction, as shown in FIG. 4. The directional changes resulting from the skewing of the directional magnetic state of the read film 14 at the termination of a read current pulse applied to word drive lead 17*a* generates signals at digit leads 21*a*, 22*a* . . . 27*a*, 28*a* of the respective storage elements 18 storing a digit "1."

The reading of a stored digit from a storage element 18 will now be more particularly described with reference to FIG. 4 showing the magnetic states of films 12 and 14 before, during and after read pulses 67 and 68 are applied. Read pulses 67 and 68 preferably have short fall times. When a "1" is written into a storage element 18 by a write current pulse 66, the resultant applied field forces the magnetic direction of films 12 and 14 to be aligned as shown in FIG. 4. At the completion of the current pulse 66, the films 12 and 14 assume the remanent one state of FIG. 4 where it is seen that the coupling between the films 12 and 14 has resulted in the skewing of the magnetic direction of the read film 14. A read current pulse 67 is applied to word drive lead 17*a* to condition the read film 14 by aligning the magnetic direction of film 14 parallel to that of film 12 and in the direction shown, it being understood that any signals 57 generated on digit leads 21*a*, 22*a*, etc., at this time are incidental to the read operation in that they would not be sensed by sense amplifiers connected to the digit lines of the respective elements in a typical memory arrangement. The coupling effects of the storage film 12 of the storage elements 18 having a stored "1," again skews the magnetic direction of the read film 14 at the termination of pulse 67 generating signal pulses 69 on digit leads 21*a*, 22*a* . . . 27*a*, 28*a* of the respective storage elements 18 having a stored "1." Even though the change in magnetic direction is small, the signal output from the digit windings 21 through 28 can be made quite large since the voltage induced therein is proportional to the time rate of change of the magnetic flux ($d\phi/dt$) rather than merely the amount thereof. These signals 69 would be sensed by sense amplifiers and when so sensed would indicate a binary "1" has been read out of the respective memory elements. When a storage element 18 is cleared by a current pulse 65, the resultant applied field causes the magnetic films 12 and 14 to be aligned in the same direction as shown in FIG. 4. The magnetic direction of the film 14 is skewed at the termination of the pulse 65 due to the previously described coupling effect of film 12, as shown by the remanent state following pulse 65 in FIG. 4. A read current pulse 68 applied to word drive lead 17*a* aligns the magnetic direction of film 14 opposite to that of film 12, as shown in FIG. 4, generating signals 58 on digit leads 21*a*, 22*a*, etc, of the respective storage elements 18 having a stored "0." The signals 58 are incidental to the read operation, in that they would not be sensed by sense amplifiers. The films 12 and 14, connected to the respective elements having opposite directional states as a result of pulse 68 will retain these same states as indicated in FIG. 4 and no signal will be generated after the termination of pulse 68. It should be noted that with the films in this condition any subsequent read pulse would not produce a signal, such as spurious signal 58 produced by current pulse 68, as the read film 14 is already aligned to the applied field that would be produced by such a pulse. The storage elements 18 shown in FIG. 2 having a stored "0" will thus not generate a signal after the termination of a read pulse at respective digit leads 21*a*, 22*a* . . . 27*a*, 28*a* of the word, thus indicating to the respective sense amplifiers that a digit "0" has been read. In the manner described, parallel readout of the storage elements 18 common to the word drive winding 17 in FIG. 2 is obtained by applying a read current pulse to word drive lead 17*a* and detecting the presence of signals following said pulse on digit leads 21*a*, 22*a* . . . 27*a*, 28*a* of the respective storage elements 18 having stored "1's," it being understood that the storage elements 18 having a stored "0" will not generate a pulse at that time at their respective digit leads 21*a*, 22*a* . . . 27*a*, 28*a*.

In the described embodiment, the read film 14 may have either one of two remanent zero states 71 and 72, shown in FIG. 4. Following the read pulse 68, the read film 14 will be in the remanent state 71 aligned with the flux path through the read film 14 produced by the magnetization of the storage film 12. The read film 14 will remain in this "0" remanent state 71 following subsequently applied read pulses. It should be noted that after the first read pulse 68, following a write zero or clear pulse 65, an unsensed output signal, such as pulse 58, will not be generated by a subsequent read pulse. It should be understood that in a memory system it would be possible to have the write zero pulse 65 followed by a conditioning pulse, such as pulse 68, and thereby condition the read film 14 to reside in the remanent zero state 71. The stored digit zero may then be read using the output signal generated by the leading edge of the read pulse, where the presence of a signal, e.g., signal 57, denotes a stored "1" and the absence of a signal denotes a stored "0."

Referring back to FIG. 2*a*, the operation of a storage element 18 relative to its use in an associative memory will now be considered where the read current is applied to digit lead 21*a* of digit winding 21 and changes of magnetic state in the read film 14 will be sensed at lead 11*a* of the conductive substrate 11. As previously described, changes in the magnetic direction of the read film 14 will generate a signal in the conductive substrate 11 which can be sensed at lead 11*a*. The binary digit stored in the storage element 18 is read in an associative operation by applying a current pulse to the digit lead 21*a* of digit winding 21 driving the read film 14 to a known state. If the coupling effects of the storage film 12 skews the magnetic direction of the read film 14 at the completion of the read current pulse as shown in FIG. 4, a signal is generated at lead 11*a* indicating that the binary state of the digit storage film 12 is aligned to the state corresponding to the applied field. Conversely, if no signal is detected at lead 11*a*, it has been determined that the binary state of the storage film 12 is in the opposite state to the applied field.

In the following description, the current pulse applied to digit lead 21*a* represents a binary descriptor digit M, the convention being that a positive pulse represents a "0" digit and a negative pulse represents a "1" digit. It will now be described by reference to FIG. 5 how a digit S stored in an associative memory is compared to a descriptor digit M, to obtain output signals indicating that the stored digit S is either equal to, less than, or greater than digit M. Referring to FIGS. 2*a* and 5, it will be seen that the presence or absence of output signals such as 172 or 174, at lead 11*a* following the application of positive current pulses, such as 61, 63, or negative current pulses, such as 62, 64, to digit lead 21*a*, are the results of comparing the stored digit S to the descriptor digit M. The read film 14 may have either one of two directional states for each of the two remanent states of the storage film 12, the magnetic direction of the read film 14 being dependent on the direction of the prior applied field as shown in FIG. 5. Consider the case in FIG. 5 where the stored digit S is a "0" such that the films 12 and 14 are as shown in the remanent zero state after the write or clear operation in FIG. 5. A "0" descriptor digit M represented by a positive current pulse 61 produces an applied field in the direction shown in FIG. 5 and changes the magnetic direction of read film 14 generating a pulse 170 which is incidental to the described comparison of stored digit S to descriptor digit M. The magnetic direction of the read film 14 produced by the "0" digit pulse 61 coincides with the magnetic path 177 through film 14 of the storage film 12 and hence no change occurs in the magnetic direction of the read film 14 following pulse 61 and no output signal is generated at this time, thus indicating that stored digit S is equal to descriptor digit M, i.e., $S=M$, as indicated in FIG. 5. An application of a negative current pulse 62, representing a "1" descriptor digit M to a magnetic storage element in a remanent state after a zero digit comparison, changes the magnetic direction of the read film 14 as shown in FIG. 5 generating a pulse 171 as a result of the leading edge of pulse 62 which is incidental to the described comparison of S to M. The magnetic direction of the read film 14 produced by the "1" digit pulse 62 is opposite to the magnetic path of the storage film 12 through film 14 and hence the film 14 will assume a skewed magnetic direction at the termination of the digit current pulse 62, as shown in FIG. 5. This directional change in the read film 14 produces a negative output signal pulse 172 indicating that stored digit S is less than descriptor digit M, i.e., $S<M$. The case will now be considered where the stored digit S is a "1" and the films 12 and 14 are as shown in the remanent one state after write operation in FIG. 5. A "0" descriptor digit M represented by a positive current pulse 63 produces an applied field in the direction shown in FIG. 5 and initially changes the magnetic direction of read film 14 generating a pulse 173 which is incidental to the described comparison of S to M. The magnetic direction of the read film 14 produced by the "0" digit pulse 63 is opposite to the magnetic path of the storage film 12 through the read film 14 and hence the film 14 will assume a skewed magnetic direction following the digit current pulse 63 as shown in FIG. 5. This latter directional change in the read film 14 produces a positive output signal pulse 174 indicating that stored digit S is greater than descriptor digit M, i.e., $S>M$. An application of a negative current pulse 64, representing a "1" descriptor digit M, initially changes the magnetic direction of the read film 14 as shown in FIG. 5 generating a pulse 175 which is incidental to the described comparison of S to M. The magnetic direction of the read film 14 produced by the "1" digit pulse 64 coincides with the magnetic path 178 of the storage film 12 through film 14 and hence no change occurs in the magnetic direction of the read film 14 at the termination of pulse 64 and no output signal is generated at this time, thus indicating that stored digit S is equal to descriptor digit M, i.e., $S=M$, as indicated in FIG. 5. The described matching of a stored digit S to a descriptor digit M yielding an equal to, less than and greater than result will be refered to when the comparative matching of a stored word to descriptor word in an associative memory array is considered.

Referring to FIG. 6, a simplified form of a memory array 201 comprising a plurality of rods each with a plurality of magnetic storage elements 18 as described in the present invention is shown together with other circuits included in the associative memory system of FIG. 1. For purposes of clarity, the associative memory is described with respect to a single plane of memory rods shown in memory array 201, however, it is realized that a three-dimensional configuration of memory rods would be preferred in a large memory. Additional planes in the memory array 201 would require well understood modifications of the selecting and driving circuitry shown in FIG. 6, but the basic description of the associative memory system would not be changed.

The memory array 201 is organized so that a memory word of eight binary digits is stored on each of the memory rods 30 through 34. A word is written into the memory array 201 in a parallel manner by first clearing the storage elements for a word, i.e., driving them to a "0" state, with a current from word drivers 208 to a selected word drive line 86 through 90. Following this clearing operation, "1's" are then written into selected digit storage positions of a word, in a manner well understood in the art, by concurrent currents from both the selected word driver 208 and digit drivers 204 on lines 91 through 98 corresponding to the "1" digits of the stored word in the manner previously described with reference to FIG. 3. The binary word "00101101" stored in input register 202 is written into memory rod 30, for example, by first driving all the magnetic storage elements along the rod 30 to a "0" state with a current from the word drivers 208 on word line 86. The "1's" are then written into the digit positions by currents from digit drivers 204 on lines 93, 95, 96, 98 concurrent with a current from word drivers 208 on line 86. Binary words successively shifted into input register 202 are also written into memory rods 31 through 34 in the described manner. The digit drivers 204 contain circuitry responsive to input data from the mask register 210 or the input register 202 shown on FIG. 1 and timing control inputs on lines P1 through P8 from a connecting computer system. When a word is written into the memory array 201, the digit drivers 204 in response to a signal level on a single data line per digit from the input register 202 and timing signals on lines P1 through P8 generate parallel current pulses on lines 91 through 98 corresponding to the respective digits of the input register 202 containing a "1" in a word to be stored in the memory array. During an associative comparison, the digit drivers 204 in response to the two data lines per digit from the mask register 210 and timing signals on lines P1 to P8, in a manner well known in the art, generate positive or negative current pulses on lines 91 through 98 corresponding to the binary state of the respective descriptor digits represented by a signal on one or the other data lines. Currents are not generated on lines 91 through 98 when both the data lines of a respective digit have a zero signal level indicating that the digit has been masked by the mask register 210. The positive or negative current pulses $i_1$ through $i_8$ on lines 91 through 98, respectively, are, as shown in FIG. 7, simultaneously initiated and sequentially terminated by timing control pulses on lines P1 through P8 to digit drivers 204. The sequential termination of currents $i_1$ through $i_8$ results in the generation of the output signals described with reference to FIG. 5 on sense leads 81 through 85 of the respective memory rods 30 through 34 which are connected to the respective match detectors 35 through 39.

The match detector circuitry 35 and word select tree circuitry 40 connecting to sense lead 81, shown in FIG. 8, will now be described. The input lead 81 to match detector circuitry 35 from the memory array 201 is connected to a signal detector 101. The signal detector 101 outputs a pulse on one of two lines 102 or 103 when it detects a pulse on the input lead 81, the selection of the particular output line 102 or 103 is dependent upon the polarity of the input pulse. The two lines 102 and 103 from the signal detector 101 are each connected to a gate 100 and 106, respectively, each with outputs connected to a flip-flop device 104 and 105, respectively. Output lines 107 and 108 of the two flip-flops 104 and 105 are connected to the inputs of AND gates 100 and 106, respectively, so that the setting of either of flip-flops 104 or 105 prevents the other from being set, it being understood that set and reset are their two states. The outputs of flip-flops 104 and 105 are ocnnected to AND gate 109 so that a signal level is present on the output lead 74 of gate 109 when both flip-flops 104 and 105 are in a reset state. An output signal level is present on lead 75 when flip-flop 104 is set and a signal level is present on lead 76 when flip-flop 105 is set. A lead 77 is provided to reset the flip-flops 104 and 105 from the connecting computer system. Signal levels on input leads 41, 42 or 43 gate the signals on leads 74, 75 or 76 through AND gates 44, 45 or 46, respectively. The outputs of AND gates 44, 45, 46 are connected to OR gate 48 which provides an output signal to AND gate 49 whenever signal levels are present on one or more of its three inputs. A signal applied to input lead T1 of AND gate 49 with a signal level present from OR gate 48 will generate a signal level at lead 50.

An associative comparison of the words stored in memory array 201 to a descriptor word will now be more particularly described with reference to FIGS. 6 and 7. Currents $i_1$ through $i_8$ applied to lines 91 through 98 each produce read currents for groups of digit windings of stored digits having the same relative denominational value in each word in the memory array. The denominational values of the stored digits are related to their positions along the rods 30 through 34 with the digits associated with digit windings 111, 121, 131, 141, 151 having the greatest denominational value in each stored word and the relative value of adjacent digits decreasing in denominational order, so that digit windings 118, 128, 138, 148, 158 are associated with the stored digit of each word having the least relative value in each stored word. The binary digits stored in the memory rods 30 through 34 are indicated in FIG. 6 in their relative locations. As indicated by the waveforms in FIG. 7, currents $i_1$ through $i_8$ are simultaneously applied to lines 91 through 98, respectively, and then sequentially terminated by the digit drivers 204 under control of timing control inputs on lines P1 to P8 from a connecting computer system. The direction of the currents correspond to the binary descriptor digits for which an associative search is being made. The associative search is for the binary word "00101101" as indicated by the digit drive currents $i_1$ through $i_8$ shown in FIG. 7. A current $i_1$ from the digit drivers 204 on line 91 produces an associative comparison of one digit in each stored word, more specifically, digits associated with digit windings 111, 121, 131, 141, 151. The current $i_1$ applied to line 91 is for a "0" digit, and zero voltage levels are maintained on leads 81, 82, 83, 84, 85 to the match detectors 35, 36, 37, 38 39 when the current is terminated, as shown in FIG. 7, indicating that the compared stored digits are all "0" digits. A "0" digit current $i_2$ on line 92 from the digit drivers 204 is then terminated. The resulting input signal on line 85 indicates that the digit in the word stored in memory rod 34 is greater than the descriptor digit represented by the digit drive current $i_2$ of line 92. The zero voltage levels on lines 81, 82, 83, 84 indicate that the descriptor digit is equal to the other compared stored digits. Since the stored binary digits in each word are being compared sequentially in the order of their decreasing value, it is ascertained by the aforementioned signal on line 85 that the word stored in memory rod 34 is greater than the descriptor word represented by the currents from the digit drivers 204. Once the relative magnitude of a stored word has been ascertained as being greater than or less than a descriptor word, subsequent signals to the match detectors 214 will not alter this determination, as considered in the description of the match detector circuitry 35 shown in FIG. 8. Continuing with the associative comparison, a "1" digit current $i_3$ on line 93 from digit drivers 204 is next terminated. It should be noted that the "1" digit current $i_3$ applied to line 93 is of opposite polarity to the "0" digit currents $i_1$ and $i_2$ applied to lines 91 and 92. The resulting output signal on line 84, which is of opposite polarity to the previously described signal on line 85, indicates that the relative value of the compared digit stored in memory rod 33 is less than the descriptor digit represented by the digit currents from the digit drivers 204. Digit currents $i_4$, $i_5$, $i_6$, $i_7$, $i_8$ on respective lines 94, 95, 96, 97, 98 are then sequentially terminated in that order, by the digit drivers 204 with the resulting signal inputs to the match detectors 35 through 39 on lines 81 through 85 shown in FIG. 7. The non-zero signals on lines 82 and 83 during the memory search period shown in FIG. 7 indicate that the data stored in memory rod 32 is greater than the descriptor word and the data stored in memory rod 31 is less than the descriptor word. A zero voltage level was maintained on line 81 during the entire memory search period shown in FIG. 7 indicating that the data word stored in the memory rod 30 is equal to the descriptor word represented by the digit currents from digit drivers 204.

Referring again to FIG. 8, the match detector 35 and word select logic 40 connecting to the memory array 201 of FIG. 6 will be further described. The flip-flops 104 and 105 are reset by a signal input on lead 77 of the match detector circuitry 35 prior to a memory search period resulting in a signal level output on lead 74 of gate 109. A positive pulse on input lead 81 during the memory search period causes the signal detector 101 to output a pulse on line 102 to gate 100 causing the flip-flop 104 to be set. When the flip-flop 104 is set, a signal output level appears on lead 75, the connected gate 109 drops the signal output level on lead 74, and the signal on lead 107 to the gate 106 prevents the flip-flop 105 from being set during the remainder of the memory search period. The output signal level on lead 75 will remain present during the remainder of the memory search period indicating that the stored word is greater than the descriptor word. A negative pulse on input lead 81 in place of the described positive pulse would have caused flip-flop 105 to be set and a resultant output signal level would be present on lead 76 indicating that the stored word is less than the descriptor word. If no input signal pulse is detected on input lead 81 during the memory search period, both flip-flops 104 and 105 will remain in a reset state and the signal level output on lead 74 of gate 109 will remain present at the end of the memory search period. A signal level on output lead 74 of the match detector 35 at the completion of the memory search period indicates that the stored word is equal to the descriptor word.

At the completion of the memory search period, a signal level will be present on leads 74, 75 or 76 from the match detector circuitry 35 to the word select circuitry 40 indicating that the stored word is respectively either equal to, greater than or less than the descriptor word. Signal levels on input leads 41, 42 or 43 gate the match detector circuitry 35 output signals on leads 74, 75 or 76 through AND gates 44, 45 or 46 respectively. A connecting computer system applies the signals to leads 41, 42 or 43 dependent upon which one of the three classifications of stored words are to be read from the memory array 201. The outputs of AND gates 44, 45, 46 are connected to OR gate 48 which provides an output signal to AND gate 49 whenever signal levels are present on one or more of its three inputs. A timing signal applied to AND gate 49 at lead T1 will generate a signal level at lead 50 if the comparison result indicated by the output signals of the match detector circuitry 35 matches the category of stored words selected to be read from memory array 201. Referring again to FIG. 6, the output signals of match detector circuitry 35, 36, 37, 38, 39 corresponding to each stored word are consecutively tested by sequentially applying timing signals to leads T1 through T5 producing sequential output signals on leads 50 through 54 connected to word drivers 208 corresponding to the stored words in the memory array 201 classified in the selected comparative grouping. The sequential output signals from the word select logic 40 to the respective word drivers 208 gate a word read pulse to the word line 86 through 90 associated with each of the selected stored words in the memory array 201. The digit signals for each word generated in parallel on lines 91 through 98, are detected by the sense amplifiers 216 as the stored words are sequentially read out of the memory array 201, thereby sequentially reading in a parallel manner the binary digits of each word as previously described with reference to FIGS. 2 and 4.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages. It is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In an associative magnetic memory: an array of bistable magnetic storage elements each said elements comprising a conductive rod-like substrate, a storage layer thereon of a high coercivity isotropicferromagnetic material, and a read layer thereon of an anisotropic ferromagnetic material of a low coercivity relative to the coercivity of said storage layer; first and second windings coupled to each of said magnetic storage elements; said array of storage elements divided into groups, each group storing the digits of a word; the first windings of the magnetic storage elements in each group being commonly connected, and the second windings of each set of magnetic storage elements for corresponding denominational stored digits of the stored words being commonly connected; writing means coupled to said commonly connected first and second windings of the storage elements for writing words in the array by switching the storage layers of a selected group of elements to a first or second stable state; common sensing means coupled to each group of the magnetic storage elements storing the digits of a word; means provided for supplying signals representing digits of a descriptor word which are to be compared with the corresponding digits of the words stored in the memory array; interrogating means coupled to said commonly connected second windings for applying interrogating signals in accordance with said descriptor word to corresponding denominational stored digits of the stored words, the interrogating signals being sufficient to switch the magnetic state of the read layer of the magnetic elements for producing output signals on said common sensing means; and means responsive to the output signals on said common sensing means for classifying the stored words in one of a plurality of classifications.

2. The invention in accordance with claim 1, wherein a signal pulse detected by said sensing means is of one polarity when the stored digit is greater than the descriptor digit and of the other polarity when the stored digit is less than the descriptor digit.

3. The invention in accordance with claim 1, wherein the descriptor digits of the descriptor word are sequentially compared in the order of their decreasing denominational value to the corresponding stored digits in the memory by said interrogation means sequentially switching the magnetic state of the read film for each set of corresponding denominational stored digits.

4. The invention in accordance with claim 3, wherein the signal pulse sensed by said sensing means is of one polarity when the stored digit is greater than the descriptor digit and of the other polarity when the stored digit is less than the descriptor digit, and a match detector circuitry, connected to each of said sensing means, responds to the first signal pulse of one polarity or the other by producing a signal indicating that the stored word is correspondingly greater than or less than the descriptor word.

5. The invention in accordance with claim 4, wherein the match detector circuitry, in the absence of a signal pulse sensed by said sensing means, supplies an output signal indicating that the stored word is equal to the compared digits of the descriptor word.

References Cited

UNITED STATES PATENTS 3,257,650 6/1966 Koerner ---------- 340—174

STANLEY M. URYNOWICZ, Jr., Primary Examiner